United States Patent
Ross, Jr.

[11] Patent Number: 5,812,671
[45] Date of Patent: Sep. 22, 1998

[54] CRYPTOGRAPHIC COMMUNICATION SYSTEM

[75] Inventor: Robert C. Ross, Jr., Daphne, Ala.

[73] Assignee: Xante Corporation, Mobile, Ala.

[21] Appl. No.: 682,298

[22] Filed: Jul. 17, 1996

[51] Int. Cl.⁶ .................................................... H04L 9/00
[52] U.S. Cl. .................................. 380/49; 380/21; 380/25
[58] Field of Search ................................. 380/25, 30, 49, 380/21

[56] References Cited

U.S. PATENT DOCUMENTS

| | | | |
|---|---|---|---|
| 5,001,755 | 3/1991 | Skret | 380/46 |
| 5,381,480 | 1/1995 | Butter et al. | 380/37 |
| 5,410,602 | 4/1995 | Finkelstein et al. | 380/21 |
| 5,475,757 | 12/1995 | Kelly | 380/24 |
| 5,680,461 | 10/1997 | McManis | 380/25 |

*Primary Examiner*—Thomas H. Tarcza
*Assistant Examiner*—Carmen D. White
*Attorney, Agent, or Firm*—Lane, Aitken & McCann

[57] ABSTRACT

In this system parties have network access to a network secure communications gateway which stores the current encryption/decryption algorithms and keys for parties registered with the network secure communications gateway. For party A to send an encrypted message to party B, party A encrypts the message using party A's secret key and encryption algorithm, copies of which are stored at the network gateway Party A sends the encrypted message, addressed to party B, initially to the gateway. The gateway decrypts the message, using party A's secret key and algorithm, and then encrypts the decrypted message using party B's secret key and algorithm. Finally, the gateway forwards the re-encrypted message to party B, where B decodes it using B's secret key and algorithm. The secure communications gateway periodically changes client keys (or algorithms and keys) to provide additional system security.

4 Claims, 3 Drawing Sheets

CRYPTOGRAPHIC COMMUNICATION SYSTEM

BACKGROUND OF THE INVENTION

1. Field of the Invention

This invention relates to a cryptographic system for data transmission over a public network, and more particularly to a system which allows parties to send encrypted data messages to one another without key transfer between the parties and without reference to the receiving parties' encryption/decryption protocol.

2. Description of the Prior Art

There are a number of systems in use which encrypt and decrypt messages transmitted over public networks, such as the internet. In each case some provision must be made for the receiver to get a key to convert the encrypted data. There are several prior art approaches to providing a receiving party with a key necessary to decrypt the encrypted message.

In some conventional cipher systems, both parties must share the same secret key before communications begins; i.e. the sending party has to give his secret key to the receiving party via a secure channel (e.g. a courier). This approach is practical in some situations, particularly where the parties have an established relationship. But it is not practical in many other situations, particularly where there are a large number of potential receiving parties with whom the sender does not have an established relation and where the encryption algorithm of the potential receiving parties is unknown to the sender. Then, too, the security of a cryptosystem relies on the secrecy the keys. The more a key is used, the greater the danger of successful attack. For this reason, different session keys are often used for each job. Distribution of session keys is a complex matter. Session keys are usually transmitted encrypted by a master key and often come from a central key distribution center (KDC).

Public key, or asymmetric, cryptosystems provide an alternative prior art approach to the key distribution problem. Through the use of public keys, a receiving party can decipher a message without access to the sender's secret key. This allows parties without prior contact to send encrypted messages over the internet, for example, provided both parties are using the same public key protocol. Compared to conventional cryptosystems, public key cryptosystems use large keys and encryption and decryption tend to be slow. A book entitled "Firewalls and Internet Security" by William R. Cheswick and Steven M. Bellovin published by Addison-Wesley Publishing Co., which is incorporated herein by reference, explains in more detail prior art approaches to provide secure communications over insecure networks.

SUMMARY OF THE INVENTION

An object of this invention is the provision of a system which allows parties to exchange encrypted messages over a public network, such as the internet, without a requirement to exchange keys and without a requirement that either party know or use an encryption algorithm which is compatible with that used by the other party.

Briefly, this invention contemplates the provision of system in which parties have network access to a network secure communications gateway which stores the current encryption/decryption algorithms and keys for parties registered with the network secure communications gateway. For party A to send an encrypted message to party B, party A encrypts the message using party A's secret key and encryption algorithm, copies of which are stored at the network gateway. Party A sends the encrypted message, addressed to party B, initially to the gateway. The gateway decrypts the message, using party A's secret key and algorithm, and then encrypts the decrypted message using party B's secret key and algorithm. Finally, the gateway forwards the re-encrypted message to party B, where B decodes it using B's secret key and algorithm. The secure communications gateway periodically changes client keys (or algorithms and keys) to provide additional system security.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT

Figure 1:
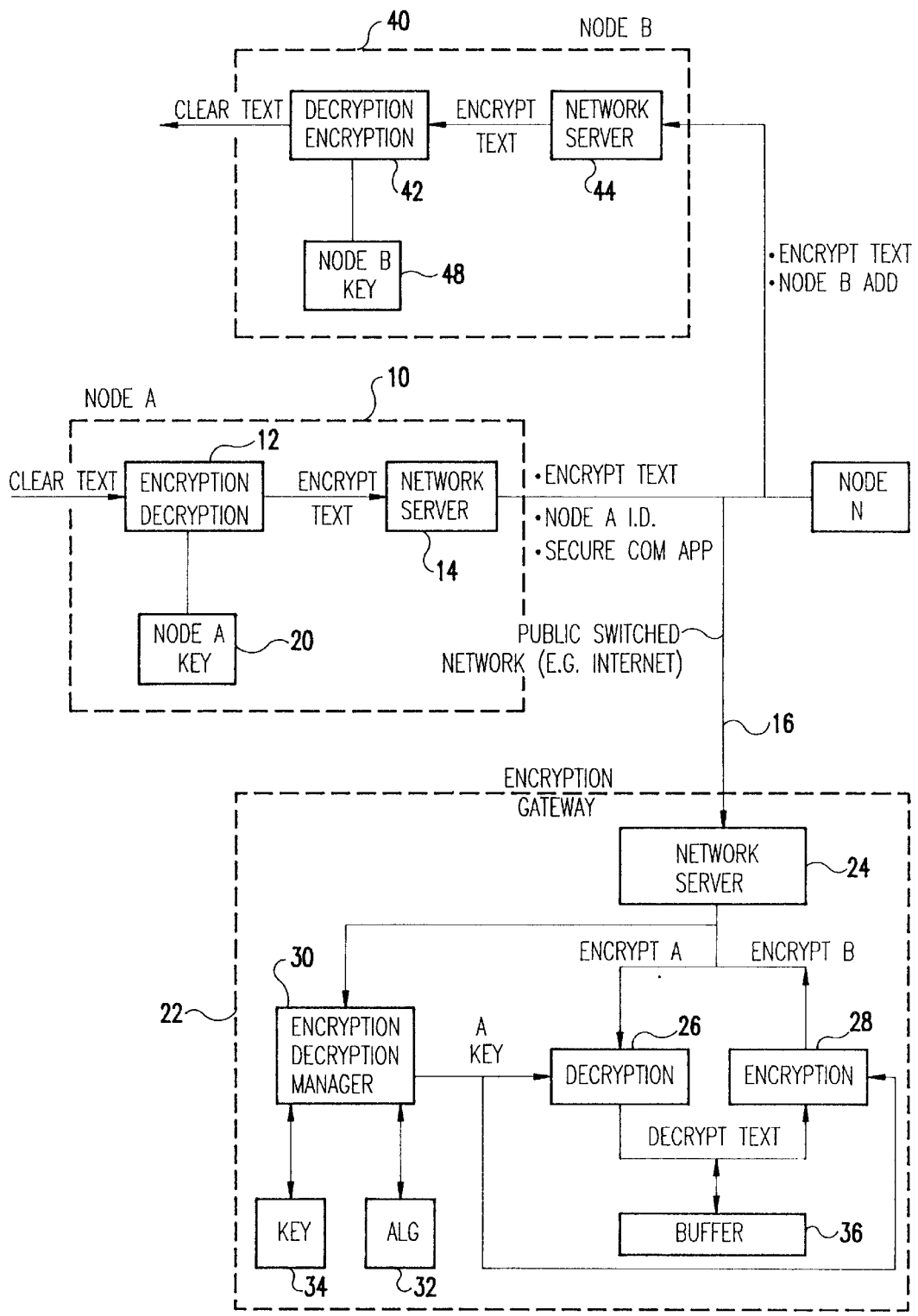
FIG. 1 is a functional block diagram of an encryption gateway system in accordance with the teachings of this invention.

Referring now to FIG. 1, in one exemplary embodiment of a cryptographic communications system in accordance with the invention, a node A computer processor, indicated by the dashed box 10, includes application programs for encryption/decryption 12 and a suitable network interface program 14 for coupling the node to a network 16, such as the internet network. As will be appreciated by those skilled in the art, suitable hardware and software programs are available in the prior art to carry out these functions. An advantage of this cryptographic communications system of this invention is that node A's choice of an encryption algorithm is independent of the decryption algorithm used by the intended recipients of node A's encrypted message and need not be known by the intended recipients. In addition, in conventional prior art encryption systems the decryption algorithm is typically an inverse operation of the encryption process. In accordance with the teachings of this invention, if desired, entirely different algorithms could be used by a given node respectively for encoding messages to be placed on the network 16 and for decrypting messages received from the network.

In the operation of node A sending an encrypted file to node B over the network 16, A's encryption application program 12 encrypts a clear text file using node A's secret key 20. The encrypted message includes an identifier of node B as the intended recipient, which may be encrypted if desired, an identifier of node A, and the network address of a secure communications encryption gateway 22. The node A identifier may be encrypted if the encryption method for the node A identifier does not require that the identity of node A be known prior to decrypting the identifier. That is, the node A identity may be clear text or may be encoded using a public key algorithm shared by Node A and the gateway 22, for example.

The encryption gateway 22 includes a network interface 24, a decryption server 26, an encryption server 28, and an encryption/decryption manager 30. The encryption/decryption program for implementing the encryption/decryption algorithm for each node and the current key for each node recognized by the encryption gateway are stored in files 32 and 34, respectively, which are accessed by the manager 30. Thus, if nodes A and B are both recognized by the encryption gateway 22, the encryption/decryption algorithm and the key for each node will be stored in files 32 and 34. In response to an incoming encoded data file from node A, the manager 30 will fetch node A's decryption algorithm from file store 32 and the then current key from store 34. The manager 30 loads these files into the decryption server 26, which de-encrypts the incoming encrypted data file, including, if necessary, the identity of the intended recipient, node B. Manager 30 fetches the encryption algorithm and the key for node B, and loads them into the encryption server 28. Decryption server 26 decrypts the encrypted message from node A using node A's algorithm and key, and the plain text file is conveniently buffer stored in buffer 36. Encryption server 28 encrypts the plain text file output of server 26 using node B's algorithm and key. The encrypted message file is then launched on to network 16 via the encryption gateway's network interface 24, addressed to node B.

Node B, as it pertains to this invention, is functionally equivalent to node A, and includes a network interface server 44, an encryption/decryption server 42 and a current key and algorithm file 48. Different reference numbers have been used for the components of node B to emphasize the fact that, while functionally equivalent, the specific encryption/decryption algorithm(s) and the key may be different as between sending and receiving nodes. As will be appreciated by those skilled in the art, a large number of nodes on the network 16 may be recognized by the encryption gateway 22; these additional nodes are represented in the drawing by the block labeled node n.

Figure 2:
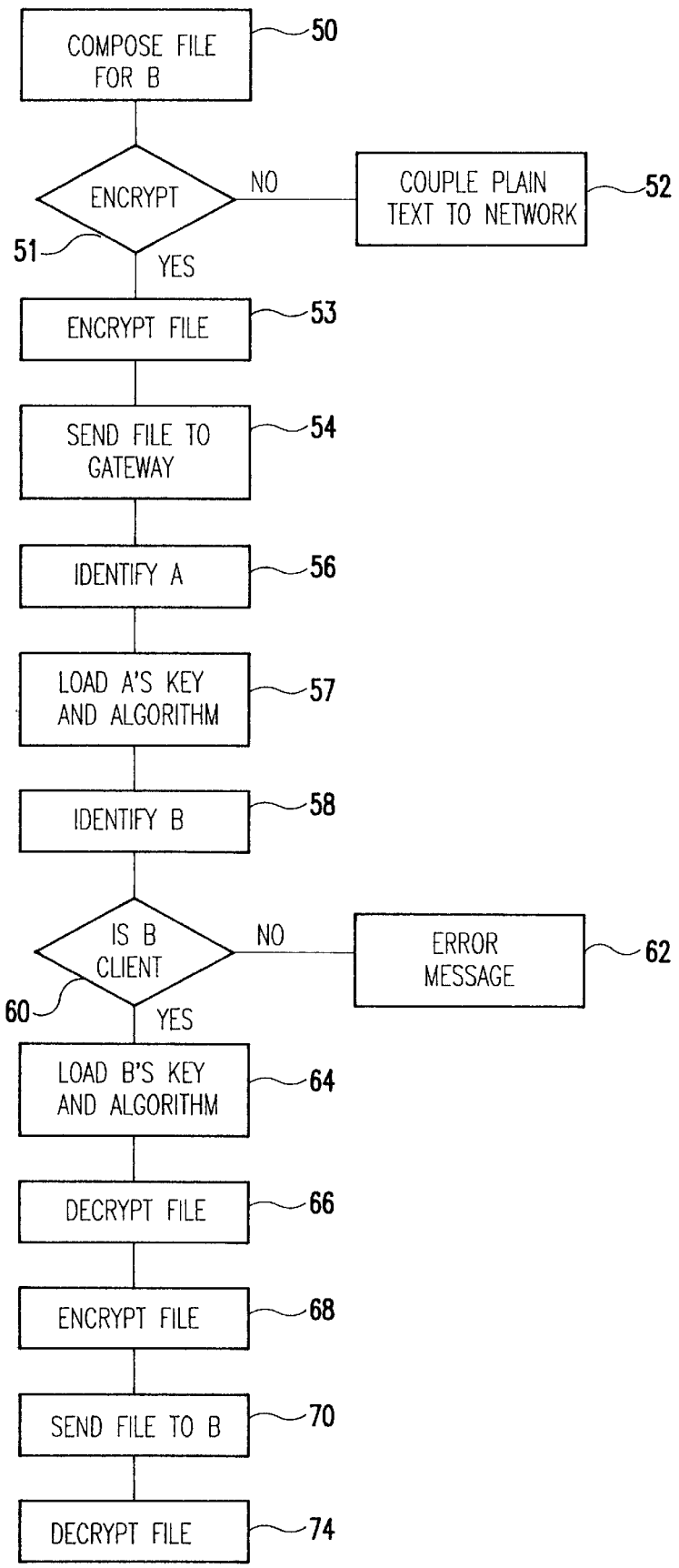
FIG. 2 is a flow chart of the steps for node A (e.g. party A) to send an encrypted message to node B (e.g. party B) via the encryption gateway system of FIG. 1.

FIG. 2 illustrates as a flow chart the operation of the system described in connection with FIG. 1. Node A (a.k.a. user A) composes a file for transfer to node B (a.k.a. user B), block 50. The file is transferred to A's network server interface, where a decision (block 51) can be executed to send the file encrypted or plain text, based on A's input. If the result of decision block 51 is not to encrypt, the plain text file is launched on the network (e.g. internet) directly addressed to B, block 52.

If the result of decision block 51 is to encrypt, the file is encrypted, block 53, and the encrypted file is launched on the network addressed to the encryption gateway, block 54. At the encryption gateway, the encrypted message is received, and the sender (A) identified, block 56. A's algorithm and current key are loaded into the decryption server (block 57), and the intended recipient (B) of A's message is identified, block 58. The status of B as a client of the encryption gateway is determined in decision block 60.

If B is not a client, an error message is sent to A (block 62), preferably an encrypted error. If B is a client, B's algorithm and key are loaded into the encryption server (block 64), the encrypted file is decrypted using A's algorithm and key (block 66) and the decrypted file is re-encrypted using B's algorithm and key, block 68. At block 70, the re-encrypted message is addressed to B and launched on the network. At B, the encrypted file is identified as a file having been sent from the encryption gateway, and the appropriate decryption algorithm and key are used to decrypt the file, block 74. Here it should be noted, a node may have more than one encryption/decryption algorithm and/or more than one key. For example, one algorithm and/or key may be used for exchanging encrypted files with a party or parties with whom the node has a prior relation, and another algorithm and/or key for exchanging encrypted files with the encryption gateway.

Figure 3:
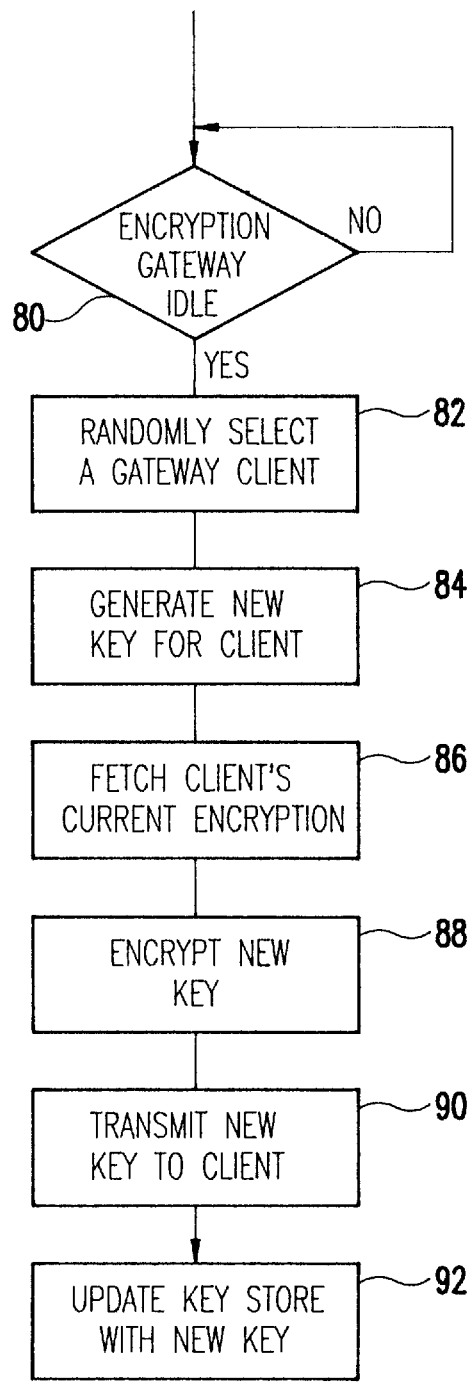
FIG. 3 is a flow chart of the operation of the secure communications gateway manager in maintaining a periodically changing encryption/decryption algorithm and/or key for each client.

As will be appreciated by those skilled in the art, the ability of someone to successfully attack a cypher may increase as the number of times the cypher or a particular key for that cypher is used increases. This is particularly true where the encrypted data is transmitted on a public network, such as the internet, to parties with whom the sender may have little or no prior contact. For this reason, the encryption manager 30 is provided with a software routine, as illustrated in FIG. 3, which periodically and automatically changes the client encryption key or the client encryption algorithm itself which would, of course, include a new key. The routine starts at decision box 80, which essentially waits for a time when the encryption gateway 22 is idle (free of incoming traffic). If the encryption gateway 22 is idle, the encryption manager 30 selects a client (block 82) from the stored list of clients, preferably using a selection algorithm which makes a more or less random client selection. A new key for the selected client algorithm is generated in block 84, preferably again using a process which randomizes the key generation. Here, it should be noted that if desired, an algorithm different from the selected clients current algorithm could be selected. In the next step 86, the client's current algorithm and key are fetched, and used to encrypt the new key (or algorithm), step 88. The encrypted new key is transmitted to the selected client in step 90, where it is used by the client as a replacement for the client's then currently used key. In block 92, the key store 34 (and algorithm store 32 if desired) is updated by replacing the existing key for the selected client with the new key.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A cryptographic communication method for transmitting encrypted messages over a public network from a sending node to a receiving node, including the steps of:

storing at an encryption gateway node a respective different private sending node decryption key and a respective different private receiving node encryption key for each of a plurality of nodes connected to said network;

first encrypting at said sending node a data file using a private sending node encryption key;

transmitting said data file encrypted in the first encrypting step over said network to an encryption gateway node;

first decrypting said data file at said encryption gateway node using a private sending node decryption key corresponding to the private sending node encryption key used in the first encrypting step;

second encrypting at said encryption gateway said data file which has been decrypted in the first decrypting step using a private receiving node encryption key for said receiving node;

transmitting said data file encrypted in the second encrypting step over said network to said receiving node;

second decrypting said data file at said receiving node using a decryption key corresponding to the private receiving node encryption key used in the second encrypting step;

periodically selecting one of said plurality of nodes connected to said network, generating a new encryption/ decryption key for said one of said plurality of nodes, encrypting said new encryption/decryption key with an encryption/decryption key previously used by said one of said plurality of nodes, transmitting said new encryption/decryption key to said selected one of said plurality of nodes, and storing said new encryption/decryption key at said encryption gateway node.

2. A cryptographic communication method as in claim 1 wherein the step of periodically selecting one of said plurality of nodes is a performed on a random basis.

3. A cryptographic communication method for transmitting encrypted messages over a public network from a sending node to a receiving node, including the steps of:

storing at an encryption gateway node a respective different private sending node decryption key and a respective different private receiving node encryption key for each of a plurality of nodes connected to said network;

first encrypting at said sending node a data file using a private sending node encryption key;

transmitting said data file encrypted in the first encrypting step over said network to an encryption gateway node;

first decrypting said data file at said encryption gateway node using a private sending node decryption key corresponding to the private sending node encryption key used in the first encrypting step;

second encrypting at said encryption gateway said data file which has been decrypted in the first decrypting step using a private receiving node encryption key for said receiving node;

transmitting said data file encrypted in the second encrypting step over said network to said receiving node;

second decrypting said data file at said receiving node using a decryption key corresponding to the private receiving node encryption key used in the second encrypting step;

periodically selecting one of said plurality of nodes connected to said network, generating a new encryption/decryption algorithm for said one of said plurality of nodes, encrypting said new encryption/decryption algorithm with an encryption/decryption algorithm previously used by said one of said plurality of nodes, transmitting said new encryption/decryption algorithm to said selected one of said plurality of nodes, and storing said new encryption/decryption algorithm at said encryption gateway node.

4. A cryptographic communication method as in claim 3 wherein the step of periodically selecting one of said plurality of nodes is a performed on a random basis.

* * * * *